United States Patent [19]
Badia et al.

[11] Patent Number: 5,392,224
[45] Date of Patent: Feb. 21, 1995

[54] MIDI THROUGH PORT HARDWARE EMULATOR

[75] Inventors: Alejandro R. Badia, Boca Raton, Fla.; David P. Pagnani, Endicott, N.Y.; Edward D. Shockley, Boynton Beach, Fla.

[73] Assignee: IBM Corporation, Armonk, N.Y.

[21] Appl. No.: 91,954

[22] Filed: Jul. 14, 1993

[51] Int. Cl.[6] ............................................. G06F 15/60
[52] U.S. Cl. .................................. 364/514; 371/16.2; 84/645
[58] Field of Search ................. 364/514; 371/16.2, 71, 371/24; 84/645

[56] References Cited
U.S. PATENT DOCUMENTS 4,168,487  9/1979  Fukuoka et al. ...................... 371/71
4,750,181  6/1988  McDonald et al. .................. 371/71

Primary Examiner—Ellis B. Ramirez
Attorney, Agent, or Firm—Richard M. Goldman

[57] ABSTRACT

Disclosed is a Musical Instrument Digital Interface emulator for testing the THRU port echo of a Musical Instrument Digital Interface device. The emulator has input devices for taking bitstream data from the THRU and OUT ports of the Musical Instrument Digital Interface device, comparing the THRU port bitstream data to the OUT port bitstream data, and generating a result of the comparison. Also disclosed is a method of testing the THRU port echo of a Musical Instrument Digital Interface device by reading the THRU bitstream and OUT bitstream of the Musical Digital Interface Device, bitwise comparing the two bit streams; and reporting the results of the comparison to an output means.

2 Claims, 3 Drawing Sheets

ONE WAY COMMUNICATION FROM A SINGLE SOURCE TO A SINGLE DESTINATION

TWO WAY DATA COMMUNICATIONS USING TWO MIDI CABELS

MIDI THROUGH PORT HARDWARE EMULATOR

FIELD OF THE INVENTION

The invention herein relates to a Musical Instrument Digital Interface (MIDI) hardware emulator that takes data from the THRU and OUT ports of the MIDI device and does a bitwise comparison. The result of the bitwise comparison is fed back to the IN port of the MIDI device.

SUMMARY OF THE INVENTION

MIDI (Musical Instrument Digital Interface) is a digital communication protocol, including a standardized control language and hardware specification that allows electronic musical instruments and devices to communicate performance and control data. By adhering to the MIDI protocol it is possible to communicate performance and control messages with user transparency, spread, and ease.

Musical performance data is communicated using the MIDI protocol. The performance data is transmitted as a string of digital MIDI messages over a unidirectional MIDI line at a data rate of 31.25 kbaud. This is shown in FIG. 1. In order to make two way communication possible, a second MIDI data line is necessary. This is shown in FIG. 1B.

MIDI data is typically transmitted serially in 8 bit bytes. The MIDI protocol defines two types of bytes, status bytes and data bytes. Status bytes are used as an identifier for instructing a receiving device which MIDI function and channel are being addressed. The most significant bit (left most bit) is used to identify the byte type. For a status byte the most significant bit is always 1, while for a data byte the most significant bit is always 0.

Consider the three bytes shown in FIG. 2. The first byte is 1001 0100. The most significant bit is 1, meaning that this is a status byte. The next three bits X001 translate, according to the MIDI protocol, as "Note On". The second four bits refer to the channel number. The channel number, 0100, is decimal 4. The second byte, following a status byte with a 1001 (Note On) status, is the note number. The note number is 0100 0000, or decimal 64. The third data byte is the attack velocity (noise level), here binary 0101 1001, i.e., decimal 89. The bit stream 1001 0100/0100 0000/0101 1001 means that a "Note On" message is being over channel 4, directing note 64 be played with a volume of 89.

Critical to the quality of operation is that the bit stream that enters the IN port of a MIDI device must pass through undistorted to the THRU port. On line, real time testing is not provided in the MIDI systems of the prior art.

OBJECTS OF THE INVENTION

Thus, it is one object of the invention to provide on line, real time testing of the MIDI device.

It is another object of the invention to provide an active wrap design for real time, on line testing that supports the industry standard cable wrap design where the MIDI emulator is connected to a MIDI supporting host via the MIDI IN port and the MIDI OUT port, the ports being connected in a crossed mode, IN port to OUT port, and OUT port to IN port.

It is a further object of the invention to allow testing of the MIDI THRU port data echo without keyboards, musical instruments, or music software.

It is a further object of the invention to provide circuitry that will test the MIDI THRU port by sending binary data from the MIDI host to the MIDI emulator IN port, and out the MIDI emulator THRU port to the MIDI host IN port, and comparing the data.

SUMMARY OF THE INVENTION

These and other objects are achieved by the method and apparatus of the invention. Specifically, the method and apparatus of the invention provides on line, real time testing of the MIDI device.

This is accomplished through the use of an active wrap design that supports the industry standard cable wrap design where the MIDI emulator is connected to a MIDI supporting host via the MIDI IN port and the MIDI OUT port, the ports being connected in a crossed mode, IN port to OUT port, and OUT port to IN port. The method and apparatus of the invention allows testing of the MIDI THRU port data echo without keyboards, musical instruments, or music software. This is accomplished with circuitry that will test the MIDI THRU port by sending binary data to the MIDI emulator IN port, and out the MIDI emulator THRU and OUT ports to a comparator for bitwise comparison. According to the method and apparatus of the invention, if a bit error is detected, the MIDI driver software or other appropriate software is notified, and an error reported.

Specifically, the method and apparatus of the invention utilizes standard MIDI IN, OUT, and THRU connectors, and a user selectable power supply, and can provide, in a preferred exemplification, a visual indication of test results.

The method and apparatus of the invention provide testing of the data integrity of the hardware, testing real time conformity of the hardware to standards and specifications, testing of the implementation of all of the MIDI connectors, lines, and data rates. This is accomplished with a system that is compatible with all current MIDI standards and implementations.

THE FIGURES

The invention may be understood by reference to the FIGURES appended hereto.

FIG. 1, denominated "Prior Art," is representation of a standard Musical Instrument Digital Interface (MIDI) device.

FIG. 2, also denominated "Prior Art," is a representation of a Standard (MIDI) device.

FIG. 3 shows a circuit diagram of one embodiment of the emulator of the invention.

DETAILED DESCRIPTION OF THE INVENTION

Figure 1:
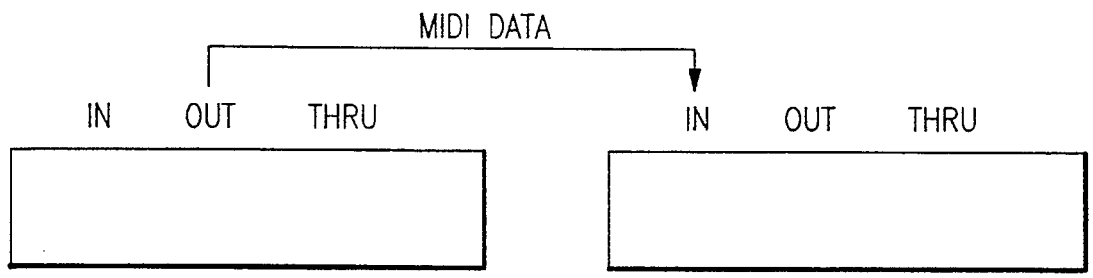
Figure 1:
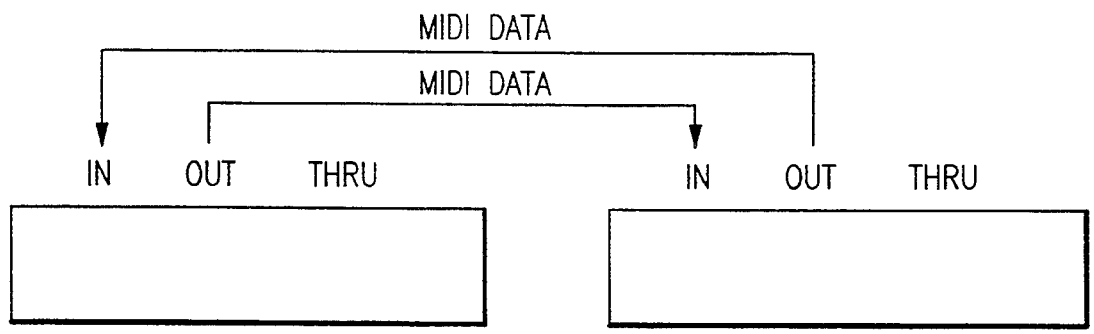
Figure 2:
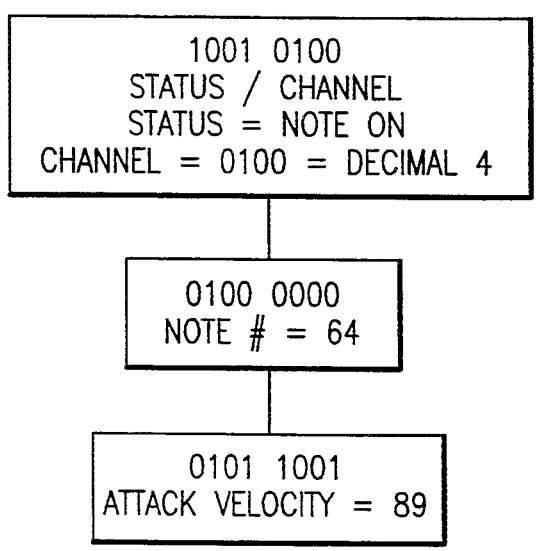
Figure 3A:
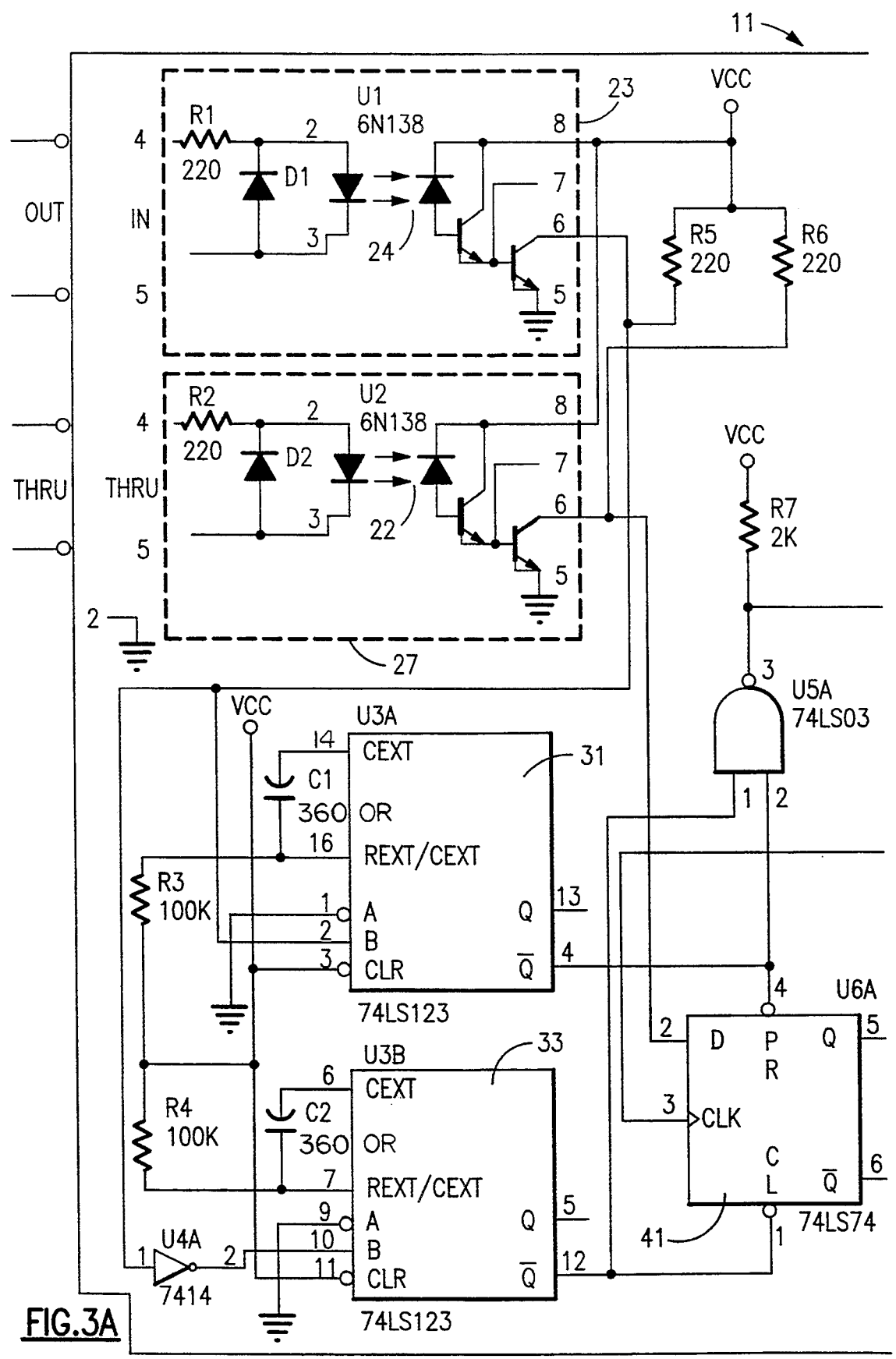
Figure 3B:
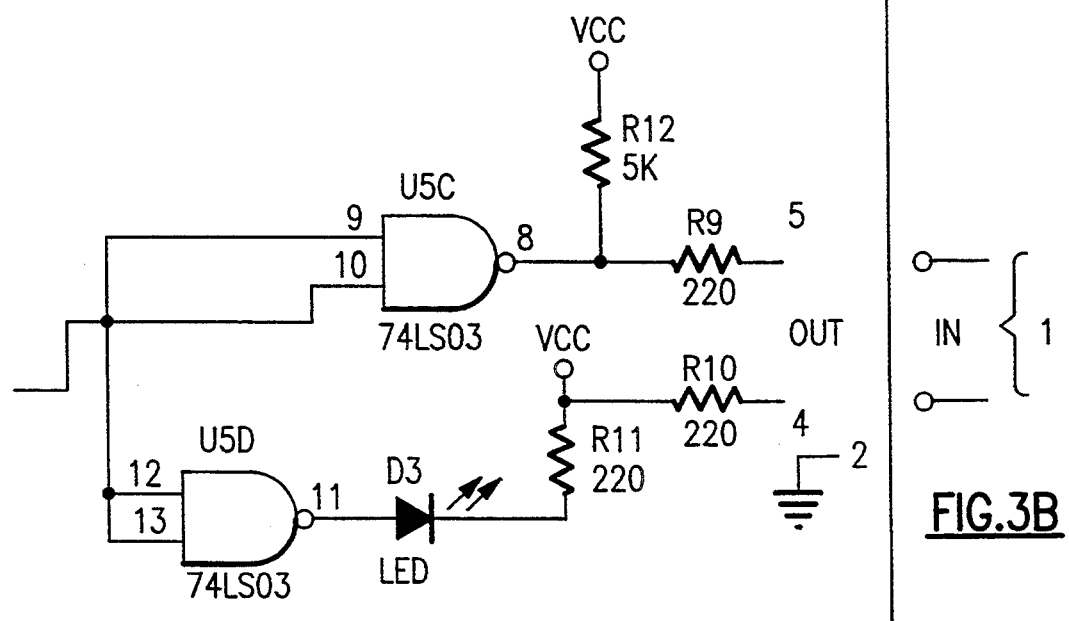

The structure for the Musical Instrument Digital Interface emulator of the invention is shown in FIG. 3. The emulator shown in FIG. 3 is useful for testing the THRU port echo of a Musical Instrument Digital Interface device.

The device, which we call an emulator, has a first means for taking bitstream data from the THRU port of the Musical Instrument Digital Interface device, and a second means for taking bitstream data from the OUT port of the Musical Instrument Digital Interface device. The emulator circuit has a circuit comparing the THRU port bitstream data to the OUT port bitstream data and generating a result of the comparison. The system also includes means for reporting the result of the comparison.

The system is shown with more particularity in FIG. 3. As there shown, the Musical Instrument Digital Interface emulator 11 for testing the THRU port echo of a Musical Instrument Digital Interface device 1.

Input from the Musical Instrument Digital Interface device 1 is in the form of bitstream data. The data is captured through first means 21 for taking bitstream data from and optically coupled by photodiode pair 22 to the THRU port of the Musical Instrument Digital Interface 1.

Input bitstream data is also captured through second means 23 for taking bitstream data from and optically coupled to the OUT port of the Musical Instrument Digital Interface device 1 by the photodiode pair 24.

In the preferred embodiment illustrated, there is provided first and second monostable vibrator means 31, 33 for providing a pulse signal of the emulator IN port for the bit comparison of the port signals, for bit comparison of the port signals. An exemplary monostable vibrator is a 74123 retriggerable monostable vibrator.

The comparison of the bitstreams is done in a flip-flop means for comparing the THRU port bitstream data to the OUT port bitstream data and generating a result of the comparison. An exemplary flip-flop is a D type flip-flop as a standard 74LS74 flip-flop. A 74LS74 flip-flop has D, as in FIG. 3, has Preset, Clear, and Clock inputs, and Q and Q bar outputs.

These inputs and outputs are shown in FIG. 3 as connected as follows:
1. The data "D" connection is from the emulator THRU port 21;
2. The data preset "PR" connection is from the emulator IN port 23;
3. The data clear "CL" connection is also from the emulator IN port 23; and
4. The clock "CLK" connection is from emulator IN port through pulsing means 31.

The Q bar output of the flip-flop 41 is the output of interest. This output can be to the input of the MIDI device 1 under test. Alternatively, or additionally, it can be through a light emitting diode or other optical or b=visual indicia.

According to the invention there is also provided a method of testing the THRU port echo of a Musical Instrument Digital Interface device. The method includes the steps of reading the THRU bitstream and OUT bitstream of the Musical Digital Interface Device. The bit streams are compared, and the results reported.

In the method of testing the THRU port echo of a Musical Instrument Digital Interface device the THRU bitstream and OUT bitstream of the Musical Digital Interface Device 1 are read. These bitstreams are then converted to pulsed, e.g., in the type 74123 or equivalent retriggerable monostable multivibrators 31, 33. These pulsed signals are then bitwise compared by passing the pulsed THRU and OUT bitstreams from the multivibrators through flip-flop means 4. The flip-flop means has the terminal connections:
 i. data "D" connection from the emulator THRU port;
 ii. data preset "PR" connection from the emulator IN port;
 iii. data clear "CL" connection from the emulator IN port; and
 iv. clock "CLK" connection from emulator IN port through pulsing means.

The output, particularly Q bar, is reported through an NAND gate to the IN port of the Musical Instrument Digital Interface.

Thus, according to the method and apparatus of our invention there is provided a method and an apparatus for the on line, real time testing of the MIDI device.

This is accomplished through the use of active wrap apparatus that conforms to the industry standards for MIDI devices and facilitates testing of the MIDI THRU port data echo without keyboards, musical instruments, or music software. This is accomplished with circuitry and methods as described above that test the MIDI THRU port by sending binary data to the MIDI emulator IN port, and out the MIDI emulator THRU and OUT ports to a comparator for bitwise comparison. According to the method and apparatus of the invention, if a bit error is detected, the MIDI driver software or other appropriate software is notified, and an error reported.

A further advantage of the invention is that the method and apparatus of the invention utilize standard MIDI IN, OUT, and THRU connectors, and a user selectable power supply, and can provide, in a preferred exemplification, a visual indication of test results.

As described hereinabove, it is now possible to provide testing of the data integrity of the hardware, testing real time conformity of the hardware to standards and specifications, testing of the implementation of all of the MIDI connectors, lines, and data rates. This is accomplished with a system that is compatible with all current MIDI standards and implementations.

While the invention has been described with respect to certain preferred embodiments and exemplifications, it is not intended to limit the scope of the invention thereby, but solely by the claims appended hereto.

We claim:

1. A Musical Instrument Digital Interface emulator for testing the THRU port echo of a Musical Instrument Digital Interface device having an IN Port and an OUT Port connected to a host, said Musical Instrument Digital Interface being connected to the host through the IN Port and the OUT Port, the IN Port and the Out Port being connected in a crossed mode IN Port to OUT Port and OUT Port to IN Port, said Musical Instrument Digital Interface emulator having circuit means for comparing the THRU port bitstream data to the OUT Port bitstream data and generating a result of the comparison, and comprising:
 a. first means for taking bitstream data from and optically coupled to the THRU port of the Musical Instrument Digital Interface device;
 b. second means for taking bitstream data from and optically coupled to the OUT port of the Musical Instrument Digital Interface device;
 c. first and second monostable vibrator means for providing a pulse signal of the emulator IN port for the bit comparison of the port signals;
 d. means for comparing the THRU port bitstream data to the OUT port bitstream data and generating a result of the comparison, said comparison means comprising D flip-flop means having:
  i. data "D" connection from the emulator THRU port;
  ii. data preset "PR" connection from the emulator IN port;

iii. data clear "CL" connection from the emulator IN port; and iv. clock "CLK" connection from emulator IN port through pulsing means; and e. means connected to the emulator OUT port for reporting the result of the comparison.

2. A method of testing the THRU port echo of a Musical Instrument Digital Interface device having an IN Port and an OUT Port connected to a host, said Musical Instrument Digital Interface being connected to the host through the IN Port and the OUT Port, the IN Port and the Out Port being connected in a crossed mode IN Port to OUT Port and OUT Port to IN Port, said Musical Instrument Digital Interface emulator having circuit means for comparing the THRU port bitstream data to the OUT Port bitstream data and generating a result of the comparison, and said method comprising the steps of:

a. reading the THRU bitstream and OUT bitstream of the Musical Digital Interface Device;

b. converting the bitstreams to pulsed signals;

c. bitwise comparing said bit streams comprising passing the pulsed THRU and OUT bitstreams thereof through flip-flop means, said flip-flop means having the connections:

i. data "D" connection from the emulator THRU port;

ii. data preset "PR" connection from the emulator IN port;

iii. data clear "CL" connection from the emulator IN port; and iv. clock "CLK" connection from emulator IN port through pulsing means; and c. reporting the results of the comparison through an output means to the IN port of the Musical Instrument Digital Interface.

* * * * *